US006469868B2

(12) United States Patent
Yamamoto et al.

(10) Patent No.: US 6,469,868 B2
(45) Date of Patent: *Oct. 22, 2002

(54) THIN FILM MAGNETIC HEAD HAVING A NONMAGNETIC CONDUCTIVE LAYER AND METHOD OF MANUFACTURING SAME

(75) Inventors: Takahiro Yamamoto, Tokyo (JP); Noboru Yamanaka, Tokyo (JP); Ken-ichi Takano, Tokyo (JP)

(73) Assignee: TDK Corporation, Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/388,936

(22) Filed: Sep. 2, 1999

(65) Prior Publication Data

US 2002/0041464 A1 Apr. 11, 2002

(30) Foreign Application Priority Data

Sep. 10, 1998 (JP) ............................................. 10-257228

(51) Int. Cl.[7] ............................ G11B 5/31; G11B 5/147; G11B 5/187
(52) U.S. Cl. ...................................... 360/126; 360/128
(58) Field of Search ................................ 360/125, 126, 360/317, 119, 128; 29/603.07, 603.14

(56) References Cited

U.S. PATENT DOCUMENTS

| 4,242,711 | A | * | 12/1980 | Sata et al. ................... 360/126 |
| 5,313,356 | A | * | 5/1994 | Ohkubo et al. ............. 360/126 |
| 5,838,521 | A | * | 11/1998 | Ravipati ...................... 360/113 |
| 5,949,627 | A | * | 9/1999 | Williams et al. ............ 360/126 |
| 6,031,696 | A | * | 2/2000 | Yamanaka .................. 360/126 |
| 6,125,010 | A | * | 9/2000 | Keel et al. .................. 360/126 |

FOREIGN PATENT DOCUMENTS

| JP | 56-156914 | * | 12/1981 |
| JP | 61-115207 | * | 6/1986 |
| JP | 62-75920 | * | 4/1987 |
| JP | 3-95713 | * | 4/1991 |
| JP | 4-114308 | * | 4/1992 |
| JP | 5-225521 | * | 9/1993 |
| JP | 8-102013 | * | 4/1996 |
| WO | 97/22965 | * | 6/1997 |

OTHER PUBLICATIONS

"Three Dimensional Dynamic Magnetic Field Analysis of Thin–Film Heads", Journal of the Magnetic Society of Japan, vol. 20, No. 2, pp. 113–116, 1996.

* cited by examiner

Primary Examiner—William Klimowicz
(74) Attorney, Agent, or Firm—Oliff & Berridge, PLC

(57) ABSTRACT

It is an object of the invention to improve characteristics of a thin-film magnetic head in the case where the frequency of data to write is high, in particular. In a thin-film magnetic head of the invention a nonmagnetic conductive member is provided to face at least part of a top pole layer of an induction-type magnetic transducer. Consequently, eddy currents are induced inside the nonmagnetic conductive member by a write current. The eddy currents suppress a magnetic field leaking from magnetic layers. In addition, the nonmagnetic conductive member is in contact with the top pole layer. Therefore, eddy currents generated inside the top pole layer are fed to the nonmagnetic conductive member, too. As a result, it is possible to prevent reductions in characteristics such as: a reduction in intensity of a write magnetic field due to eddy currents; an increase in delay between a write current and generation of a write magnetic field; and a decrease in gradient of rise of a write magnetic field with respect to time.

10 Claims, 8 Drawing Sheets

THIN FILM MAGNETIC HEAD HAVING A NONMAGNETIC CONDUCTIVE LAYER AND METHOD OF MANUFACTURING SAME

BACKGROUND OF THE INVENTION

1. Field of the Invention

The present invention relates to a thin-film magnetic head having at least an induction-type magnetic transducer and a method of manufacturing the thin-film magnetic head.

2. Description of the Related Art

Thin-film magnetic heads have been widely used in hard disk drives used for computers and so on. Composite thin-film magnetic heads in particular have been widely used. A composite thin-film magnetic head is made of a layered structure including a recording head having an induction-type magnetic transducer for writing and a reproducing head having a magnetoresistive (MR) element for reading.

An induction-type magnetic transducer has two magnetic layers and a thin-film coil placed between the magnetic layers. The magnetic layers include magnetic pole portions opposed to each other with a gap layer in between. The pole portions are placed on a side of end faces of the magnetic layers facing toward a recording medium. The magnetic layers are magnetically coupled to each other on the other side.

With an increase in recording density of a hard disk drive used for computers and so on, the maximum frequency of data recorded or reproduced through the use of a thin-film magnetic head has reached a frequency as high as 100 MHz or above. In the case of an extremely high-speed hard disk drive, in particular, the maximum frequency of data to write has reached the order of 200 MHz. If the frequency of data to write increases, eddy current loss increases in the magnetic layers of an induction-type magnetic transducer. Accordingly, the following problems of reductions in properties have arisen: a reduction in intensity of a write magnetic field generated from the pole portions opposed to each other with the gap layer in between; an increase in delay between a write current (a current responsive to data to write) supplied to the coil and generation of a write magnetic field; and a decrease in gradient of rise of a write magnetic field with respect to time.

In order to suppress such eddy current loss, measures have been devised in related art, such as reducing a magnetic path length, that is, the length of the magnetic path made up of the magnetic layers between the medium-facing-surface-side end and the other end, or using a magnetic material with a high resistivity for the magnetic layers.

To reduce the magnetic path length, it is required to reduce the number of turns of the coil or to tightly wind the coil. However, there is a limit to doing so in terms of manufacturing method or performance characteristics.

Even if a magnetic material with a high resistivity is used for the magnetic layers to suppress eddy current loss or a material with a high saturation flux density is used to increase the intensity of a write magnetic field, it is difficult to sufficiently increase the intensity of a write magnetic field or the gradient of rise of a write magnetic field with respect to time when the frequency of data to write increases.

SUMMARY OF THE INVENTION

It is an object of the invention to provide a thin-film magnetic head and a method of manufacturing the same for improving performance characteristics thereof in the case where the frequency of data to write is high, in particular.

A thin-film magnetic head of the invention comprises: two magnetic layers including magnetic pole portions opposed to each other and placed in regions on a side of ends of the magnetic layers facing toward a recording medium, and connecting portions magnetically coupled to each other and placed in regions on a side of the other ends of the magnetic layers, the magnetic layers each being made up of at least one layer; a gap layer provided between the pole portions of the magnetic layers; a thin-film coil placed between the magnetic layers, being insulated from the magnetic layers; and a nonmagnetic conductive member placed to face at least part of at least one of the magnetic layers. In the invention the expression 'to face at least part of the magnetic layer' includes the case in which the member faces at least part of the magnetic layer, being in contact with the at least part of the magnetic layer and the case in which the member faces at least part of the magnetic layer with another layer in between.

According to the magnetic head of the invention, eddy currents are induced inside the nonmagnetic conductive member by a write current. The eddy currents suppress a magnetic field leaking from the magnetic layers.

In the magnetic head the nonmagnetic conductive member may be placed to face a portion of at least one of the magnetic layers including the vicinity of the connecting portion.

In the magnetic head the nonmagnetic conductive member may face a surface of the at least one of the magnetic layers opposite to a surface thereof on a side of which the thin-film coil is placed. Alternatively, the nonmagnetic conductive member may face a surface of the at least one of the magnetic layers on a side of which the thin-film coil is placed.

In the magnetic head the nonmagnetic conductive member may be in contact with at least one of the magnetic layers. In this case eddy currents generated inside the magnetic layer are fed to the nonmagnetic conductive member, too. The adverse effects of eddy currents are thereby reduced.

The magnetic head may further comprise an insulating layer placed between the nonmagnetic conductive member and the magnetic layer which the nonmagnetic conductive member faces.

In the magnetic head the resistivity of the nonmagnetic conductive member is preferably lower than that of the magnetic layer which the nonmagnetic conductive member faces.

A method of the invention is provided for manufacturing a thin-film magnetic head comprising: two magnetic layers including magnetic pole portions opposed to each other and placed in regions on a side of ends of the magnetic layers facing toward a recording medium, and connecting portions magnetically coupled to each other and placed in regions on a side of the other ends of the magnetic layers, the magnetic layers each being made up of at least one layer; a gap layer provided between the pole portions of the magnetic layers; and a thin-film coil placed between the magnetic layers, being insulated from the magnetic layers. The method includes: the steps of forming the magnetic layers, the gap layer, and the thin-film coil, respectively; and the step of forming a nonmagnetic conductive member such that the member faces at least part of at least one of the magnetic layers.

In the method of the invention the nonmagnetic conductive member may be placed to face a portion of at least one of the magnetic layers including the vicinity of the connecting portion in the step of forming the nonmagnetic conductive member.

In the method the nonmagnetic conductive member may be placed to face a surface of the at least one of the magnetic layers opposite to a surface thereof on a side of which the thin-film coil is placed in the step of forming the nonmagnetic conductive member. Alternatively, the nonmagnetic conductive member may be placed to face a surface of the at least one of the magnetic layers on a side of which the thin-film coil is placed.

In the method the nonmagnetic conductive member may be brought to contact with at least one of the magnetic layers in the step of forming the nonmagnetic conductive member.

In the method an insulating layer may be further formed between the nonmagnetic conductive member and the magnetic layer which the nonmagnetic conductive member faces.

In the method the resistivity of the nonmagnetic conductive member is preferably lower than that of the magnetic layer which the nonmagnetic conductive member faces.

Other and further objects, features and advantages of the invention will appear more fully from the following description.

DETAILED DESCRIPTION OF THE PREFERRED EMBODIMENTS

Preferred embodiment of the invention will now be described in detail with reference to the accompanying drawings. The following embodiments are example wherein the invention is applied to a composite thin-film magnetic head.

[First Embodiment]

Figure 1:
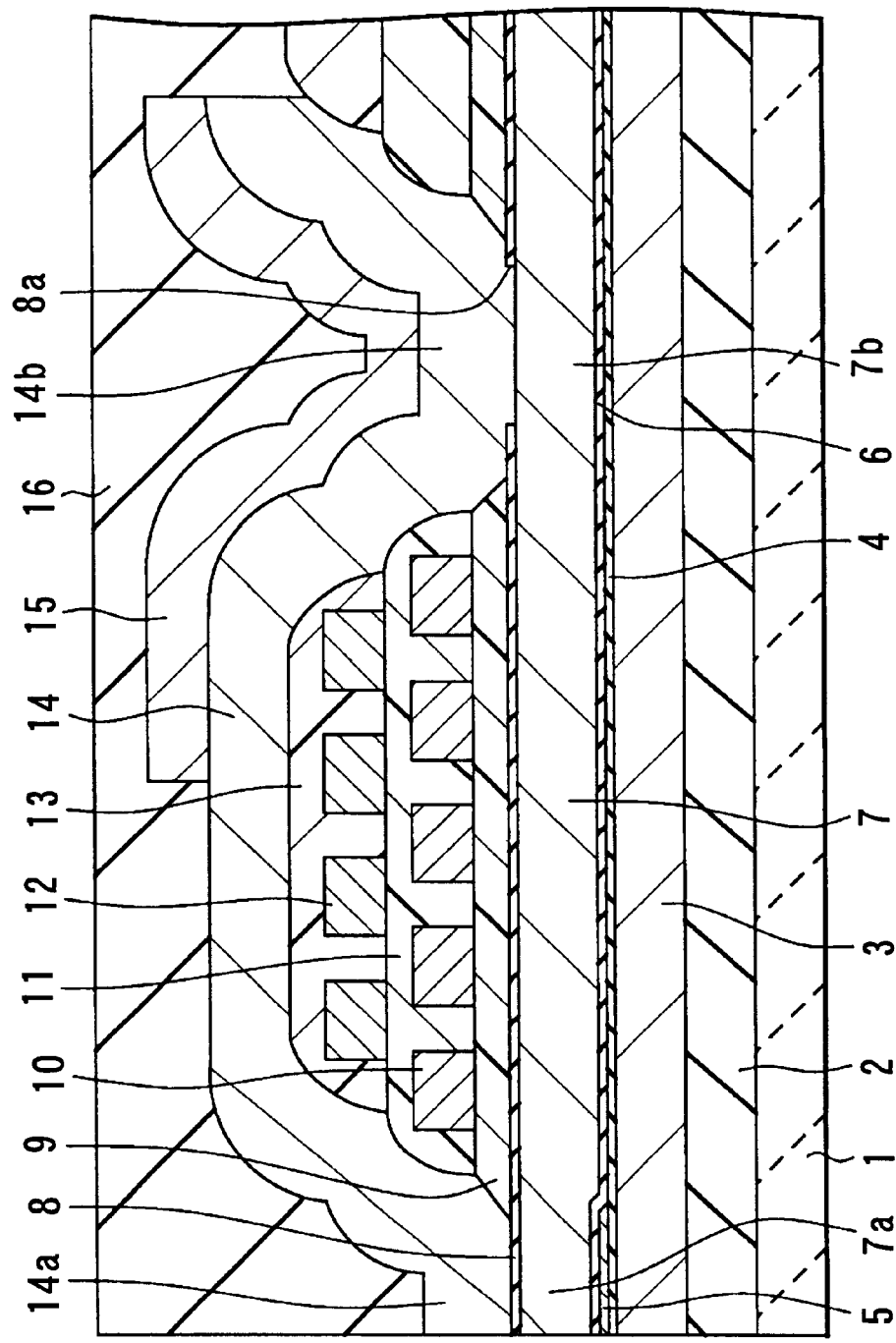
FIG. 1 is a cross section of a thin-film magnetic head of a first embodiment of the invention.

FIG. 1 is a cross section of a thin-film magnetic head of a first embodiment of the invention. The thin-film magnetic head comprises: a substrate 1; an insulating layer 2 provided on a surface of the substrate 1; and a bottom shield layer 3 made of a magnetic material and used for a reproducing head. The bottom shield layer 3 is provided on a surface (a top surface in FIG. 1) of the insulating layer 2 that is opposite to the surface on which the substrate 1 is placed.

The thin-film magnetic head further comprises: a bottom shield gap film 4 as an insulating layer placed on a surface (a top surface in FIG. 1) of the bottom shield layer 3 that is opposite to the surface on which the insulating layer 2 is placed; an MR element 5 for reproduction placed in a region facing a recording medium (the left side of FIG. 1) on a surface (a top surface in FIG. 1) of the bottom shield gap film 4 that is opposite to the surface on which the bottom shield layer 3 is placed; and a top shield gap film 6 as an insulating layer placed on a surface (a top surface in FIG. 1) of the MR element 5 that is opposite to the surface on which the bottom shield gap film 4 is placed and on a surface (a top surface in FIG. 1) of the bottom shield gap film 4 that is opposite to the surface on which the bottom shield layer 3 is placed. Although not shown, a pair of electrode layers are connected to the MR element 5. The electrode layers are placed between the bottom shield gap film 4 and the top shield gap film 6. The MR element 5 may be either a giant magnetoresistive (GMR) element or an anisotropic magnetoresistive (AMR) element.

The thin-film magnetic head further comprises a top shield layer-cum-bottom pole layer (called bottom pole layer in the following description) 7 made of a magnetic material and used for both reproducing head and recording head. The bottom pole layer 7 is placed on a surface (a top surface in FIG. 1) of the top shield gap film 6 that is opposite to the surface on which the bottom shield gap film 4 is placed. The magnetic head further comprises: a recording gap layer 8 made of an insulating film and placed on a surface (a top surface in FIG. 1) of the bottom pole layer 7 that is opposite to the surface on which the top shield gap film 6 is placed; a photoresist layer 9 that defines the throat height, placed on part of a surface (a top surface in FIG. 1) of the recording gap layer 8 that is opposite to the surface on which the bottom pole layer 7 is placed; a thin-film coil 10 of a first layer for the induction recording head, placed on a surface (a top surface in FIG. 1) of the photoresist layer 9 that is opposite to the surface on which the recording gap layer 8 is placed; a photoresist layer 11 covering the coil 10; a thin-film coil 12 of a second layer for the recording head, placed on a surface (a top surface in FIG. 1) of the photoresist layer 11 that is opposite to the surface on which the photoresist layer 9 is placed; and a photoresist layer 13 covering the coil 12. The magnetic head further comprises a top pole layer 14 made of a magnetic material. The top pole layer 14 is placed to face the bottom pole layer 7 with the recording gap layer 8, photoresist layer 9, the coil 10, the photoresist layer 11, the coil 12 and the photoresist layer 13 in between.

The induction-type magnetic transducer includes: the bottom pole layer 7, the recording gap layer 8, the photoresist layers 9, 11 and 13, the coils 10 and 12, and the top pole layer 14. The bottom pole layer 7 and the top pole layer 14 correspond to two magnetic layers of the invention.

The bottom pole layer 7 and the top pole layer 14 may be made of NiFe (80 weight % Ni and 20 weight % Fe) or a high saturation flux density material such as NiFe (50 weight % Ni and 50 weight % Fe), Sendust, FeN or a compound thereof, or an amorphous of Fe—Co—Zr. Alternatively, the pole layers 7 and 14 may be made of layers of two or more of the above materials.

A contact hole 8a for making a magnetic path is formed in the recording gap layer 8 in the vicinity of the center of the coils 10 and 12. The bottom pole layer 7 and the top pole layer 14 are brought to contact with each other through the contact hole 8a and magnetically coupled to each other.

Portions of the bottom pole layer 7 and the top pole layer 14 on a side of ends facing a recording medium, the portions being opposed to each other with the recording gap layer 8 in between, are each called pole portions 7a and 14a, respectively. Portions of the bottom pole layer 7 and the top pole layer 14 in contact with each other through the contact hole 8a are each called connecting portions 7b and 14b, respectively.

The magnetic head further comprises: a nonmagnetic conductive member 15 placed to face at least part of the top pole layer 14; and an overcoat layer 16 covering the top pole layer 14 and the nonmagnetic conductive member 15.

Figure 2:
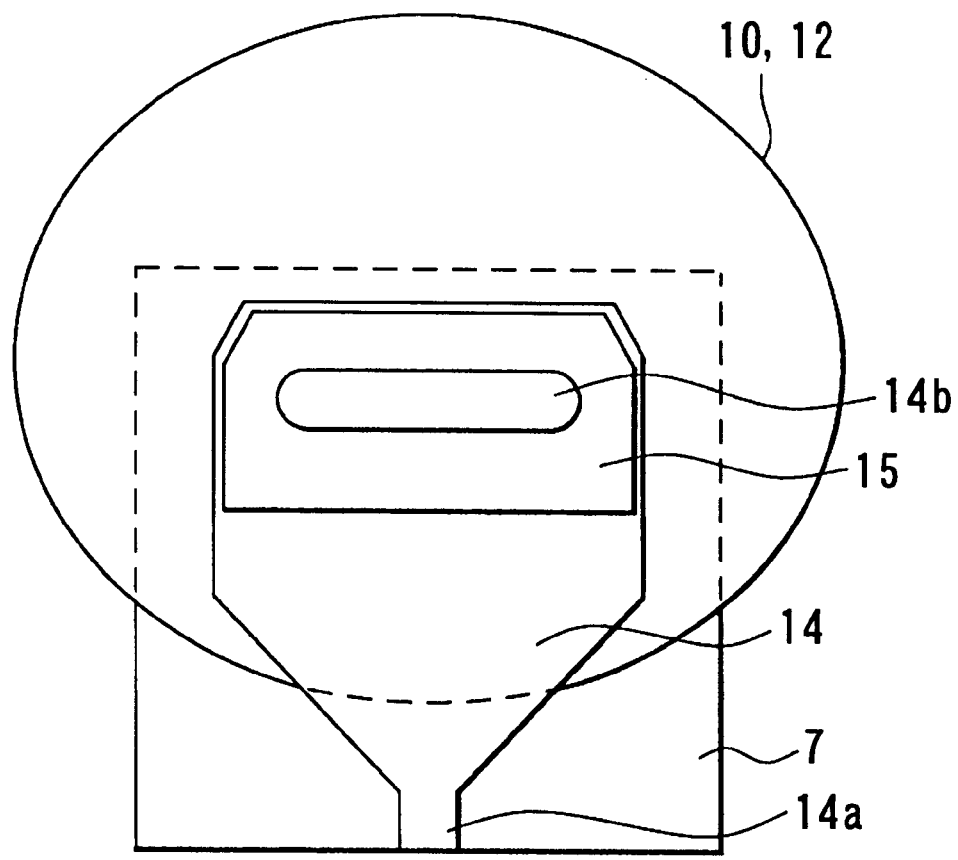
FIG. 2 is a top view of the thin-film magnetic head of the first embodiment.

FIG. 2 is a top view of the magnetic head of the embodiment. The overcoat layer 16 is omitted in FIG. 2.

In the embodiment, in particular, the nonmagnetic conductive member 15 is placed to face the surface of the top pole layer 14 opposite to the surface on a side of which the coils 10 and 12 are placed. The member 15 is also placed to face part of the top pole layer 14 including the vicinity of the connecting portion 14b. In the embodiment, in particular, an end of the member 15 closer to the medium facing surface (the bottom part of FIG. 1) extends to the vicinity of the middle point between the pole portion 14a and the connecting portion 14b. The member 15 is in contact with the top pole layer 14.

The nonmagnetic conductive member 15 is made of a material that is nonmagnetic and conductive. Such a material may be copper (Cu), aluminum (Al), gold (Au), or an alloy including any of these substances. It is preferred that the resistivity of the member 15 is lower than that of the top pole layer 14 which the member 15 faces. Numerically, the resistivity of the member 15 is preferably 0.2 to 20.0 $\mu\Omega$-cm. The thickness of the member 15 is preferably 2.0 to 4.0 $\mu$m.

An example of a method of manufacturing the thin-film magnetic head of the embodiment will now be described. In the manufacturing method, the insulating layer 2 made of alumina ($Al_2O_3$), for example, of about 5 $\mu$m in thickness is deposited on the substrate 1 made of aluminum oxide and titanium carbide ($Al_2O_3$—TiC), for example. On the insulating layer 2 the bottom shield layer 3 made of a magnetic material and having a thickness of 2 to 3 $\mu$m is formed.

Next, on the bottom shield layer 3 alumina or aluminum nitride, for example, of 50 to 150 nm in thickness is deposited through sputtering to form the bottom shield gap film 4. On the bottom shield gap film 4 an MR film having a thickness of tens of nanometers is formed for making the MR element 5. Next, on the MR film a photoresist pattern is selectively formed where the MR element 5 is to be formed. Next, with the photoresist pattern as a mask, the MR film is etched through ion-milling, for example, to form the MR element 5. Next, on the bottom shield gap film 4 a pair of electrode layers (not shown) are formed into specific patterns. The electrode layers are electrically connected to the MR element 5.

Next, the top shield gap film 6 of 50 to 150 nm in thickness is formed on the bottom shield gap film 4 and the MR element 5. The MR element 5 is embedded in the shield gap films 4 and 6. Next, on the top shield gap film 6 the bottom pole layer 7 having a thickness of about 3 $\mu$m is formed.

Next, on the bottom pole layer 7, the recording gap layer 8 made of an insulating film such as an alumina film whose thickness is about 0.2 to 0.3 $\mu$m is formed. On the recording gap layer 8 the photoresist layer 9 having a thickness of about 1.0 to 2.0 $\mu$m is formed into a specific pattern. Next, the thin-film coil 10 of the first layer, having a thickness of 3 $\mu$m, for example, is formed on the photoresist layer 9. The photoresist layer 11 is then formed into a specific pattern on the photoresist layer 9 and the coil 10. Next, the thin-film coil 12 of the second layer, having a thickness of 3 $\mu$m, for example, is formed on the photoresist layer 11. The photoresist layer 13 is then formed into a specific pattern on the photoresist layer 11 and the coil 12.

Next, a portion of the recording gap layer 8 around the center of the coils 10 and 12 is etched to form the contact hole 8a for making the magnetic path. Next, the top pole layer 14 made of a magnetic material and having a thickness of about 3 $\mu$m, is formed on the recording gap layer 8, and the photoresist layers 9, 11 and 13. The top pole layer 14 is in contact with the bottom pole layer 7 and magnetically coupled to the bottom pole layer 7 through the contact hole 8a.

Next, the recording gap layer 8 and part of the bottom pole layer 7 are etched through ion milling, for example, using the top pole layer 14 as a mask. A trim structure is thus formed. Next, on the top pole layer 14 the nonmagnetic conductive member 15 made of a nonmagnetic and conductive material is formed through plating, for example, into a specific pattern. Next, the overcoat layer 16 of alumina, for example, having a thickness of 20 to 30 $\mu$m is formed to cover the top pole layer 14 and the member 15. Finally, machine processing of the slider is performed to form the air bearing surface of the recording head and the reproducing head. The thin-film magnetic head shown in FIG. 1 is thus completed.

The functions and effects of the thin-film magnetic head of the embodiment will now be described. In the magnetic head, if a write current is fed through the coils 10 and 12, a magnetic field is generated and a magnetic flux passes through the bottom pole layer 7 and the top pole layer 14. The polarity of the write current being reversed, eddy currents are generated inside the pole layers 7 and 14 so as to interfere with the reverse of the polarity. The eddy currents result in reductions in performance characteristics such as: a reduction in intensity of the write magnetic field; an increase in delay between the write current and generation of the write magnetic field; and a decrease in gradient of rise of the write magnetic field with respect to time.

In the embodiment the nonmagnetic conductive member 15 is provided to face at least part of the top pole layer 14. Therefore, eddy currents are induced inside the member 15 by the write current. The eddy currents suppress magnetic flux leakage from the top pole layer 14. As a result, it is possible to prevent reductions in characteristics such as: a reduction in intensity of the write magnetic field; an increase in delay between the write current and generation of the write magnetic field; and a decrease in gradient of rise of the write magnetic field with respect to time. In particular, the characteristics of the thin-film magnetic head are improved in the case where the frequency of data to write is high.

In the embodiment the nonmagnetic conductive member 15 is in contact with the top pole layer 14. Therefore, eddy currents generated inside the top pole layer 14 are fed to the member 15, too. As a result, it is possible to prevent reductions in characteristics such as: a reduction in intensity of the write magnetic field; an increase in delay between the write current and generation of the write magnetic field; and a decrease in gradient of rise of the write magnetic field with respect to time. In particular, the characteristics of the thin-film magnetic head are improved in the case where the frequency of data to write is high.

In the embodiment, if the resistivity of the nonmagnetic conductive member 15 is lower than that of the top pole layer 14 which the member 15 faces, eddy currents are easily fed to the member 15. As a result, the characteristics of the thin-film magnetic head are more effectively improved.

As disclosed in Takayoshi Ohtsu, et al., 'Three-dimensional Dynamic Magnetic Field Analysis of Thin-Film Heads', The Journal of the Magnetics Society of Japan, Vol. 20, No.2, pp. 113–116, 1996, relatively high eddy currents are generated in the vicinity of the connecting portions 7*b* and 14*b* in the thin-film magnetic head. In the embodiment of the invention, the nonmagnetic conductive member 15 is placed to face part of the top pole layer 14 including the vicinity of the connecting portion 14*b*. As a result, the following functions are more remarkably accomplished: the function of suppressing magnetic flux leakage from the top pole layer 14 by eddy currents induced by the member 15; and the function of feeding eddy currents generated inside the top pole layer 14 to the member 15. The characteristics of the thin-film magnetic head are thereby efficiently improved.

Figure 3:
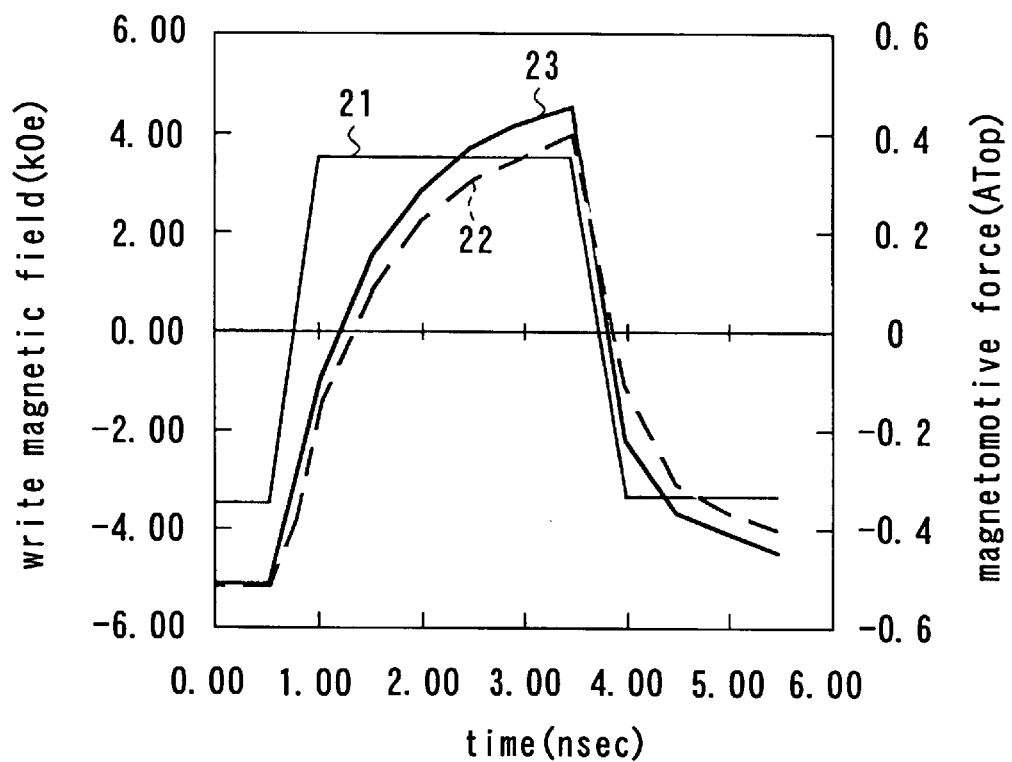
FIG. 3 is a plot for illustrating an example of a simulation result for showing effects of the thin-film magnetic head of the first embodiment.

FIG. 3 shows an example of a result of the time response characteristic of a write magnetic field in response to a write current, obtained by a simulation in order to examine the effect of the thin-film magnetic head of the embodiment of the invention. In FIG. 3 numeral 21 indicates changes in magnetomotive force in response to the write current. Numeral 22 indicates changes in write magnetic field when the member 15 is not provided. Numeral 23 indicates changes in write magnetic field when the member 15 is provided.

The parameters of the thin-film magnetic head used for the simulation are as follows.

magnetic path length: 40 $\mu$m throat height: 1.0 $\mu$m track width: 1.5 $\mu$m recording gap layer thickness: 0.3 $\mu$m pole portion thickness of the top pole layer: 3.0 $\mu$m pole portion thickness of the bottom pole layer: 3.0 $\mu$m saturation flux density of the top pole layer: 1.0 T saturation flux density of the bottom pole layer: 1.0 T nonmagnetic conductive member thickness: 3.0 $\mu$m nonmagnetic conductive member resistivity: 2.6 $\mu\Omega$-cm As shown in FIG. 3, when the nonmagnetic conductive member 15 is provided, the intensity of the write magnetic field is enhanced, the delay between the write current and generation of the write magnetic field is reduced, and the gradient of rise of the write magnetic field with respect to time is increased, compared to the case where the member 15 is not provided.

According to the thin-film magnetic head of the embodiment thus described, it is possible to prevent reductions in characteristics such as: a reduction in intensity of the write magnetic field; an increase in delay between the write current and generation of the write magnetic field; and a decrease in gradient of rise of the write magnetic field with respect to time. In particular, the characteristics of the magnetic head are improved in the case where the frequency of data to write is high. As a result, the embodiment achieves improvements in nonlinear transition shift (NLTS) and in overwrite property, that is, the property required for writing data over data already written on a recording medium.

[Second Embodiment]

Figure 4:
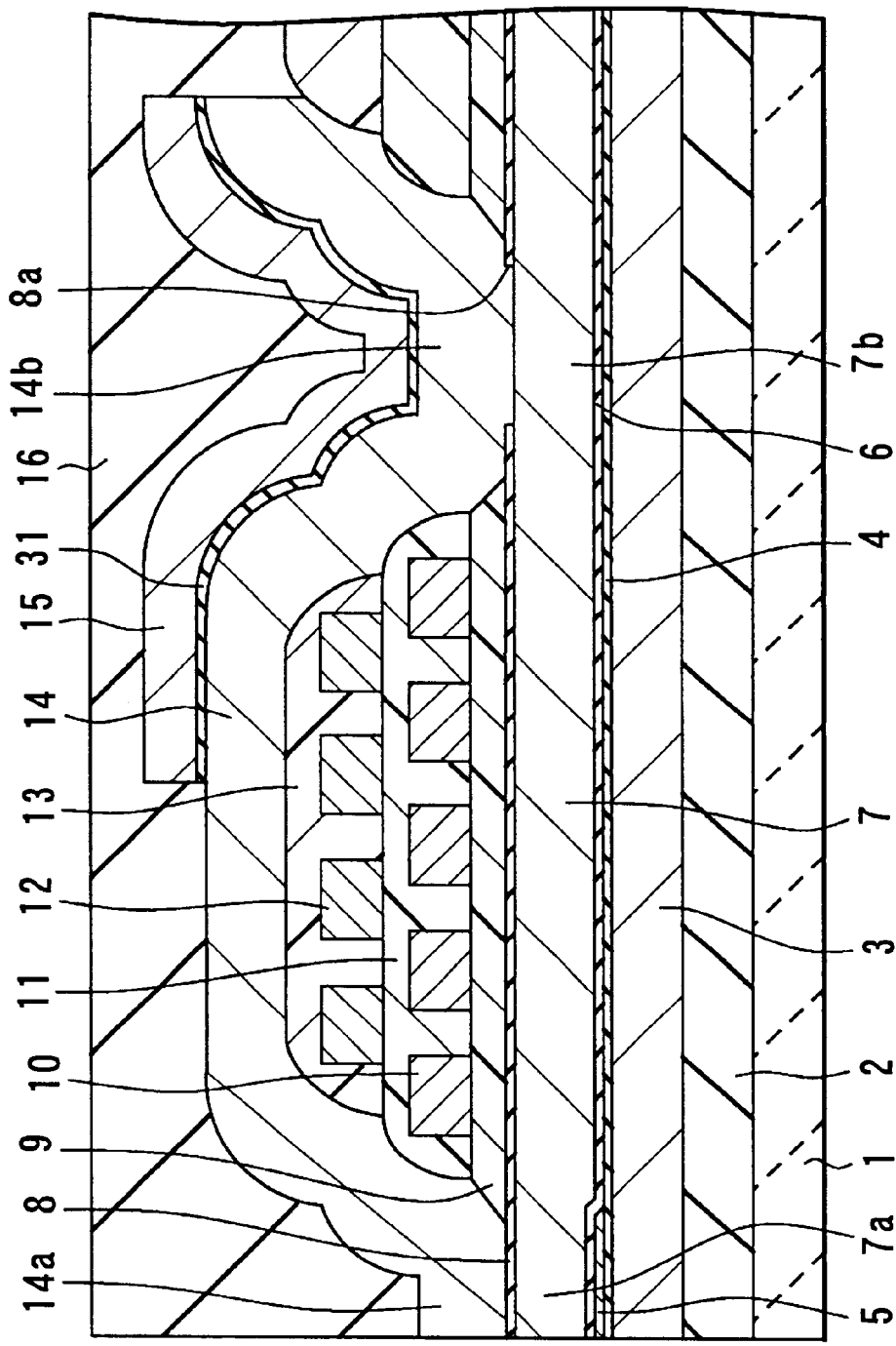
FIG. 4 is a cross section of a thin-film magnetic head of a second embodiment of the invention.

A second embodiment of the invention will now be described. FIG. 4 is a cross section of a thin-film magnetic head of the embodiment. The magnetic head of the embodiment is similar to that of the first embodiment except that an insulating layer 31 is further provided between the nonmagnetic conductive member 15 and the top pole layer 14 which the member 15 faces. The remainder of the configuration of the second embodiment is similar to that of the first embodiment.

The insulating layer 31 may be made of a material such as alumina or aluminum nitride. The thickness of the insulating layer 31 is preferably 1.0 $\mu$m or below. In the embodiment the thickness is 0.5 $\mu$m as an example. The insulating layer 31 may be formed on the top pole layer 14 through sputtering, for example.

The functions and effects of the magnetic head of the embodiment is similar to those of the first embodiment except the functions and effects of the head of the first embodiment resulting from eddy currents generated inside the top pole layer 14 and fed to the nonmagnetic conductive material 15.

[Third Embodiment]

Figure 5:
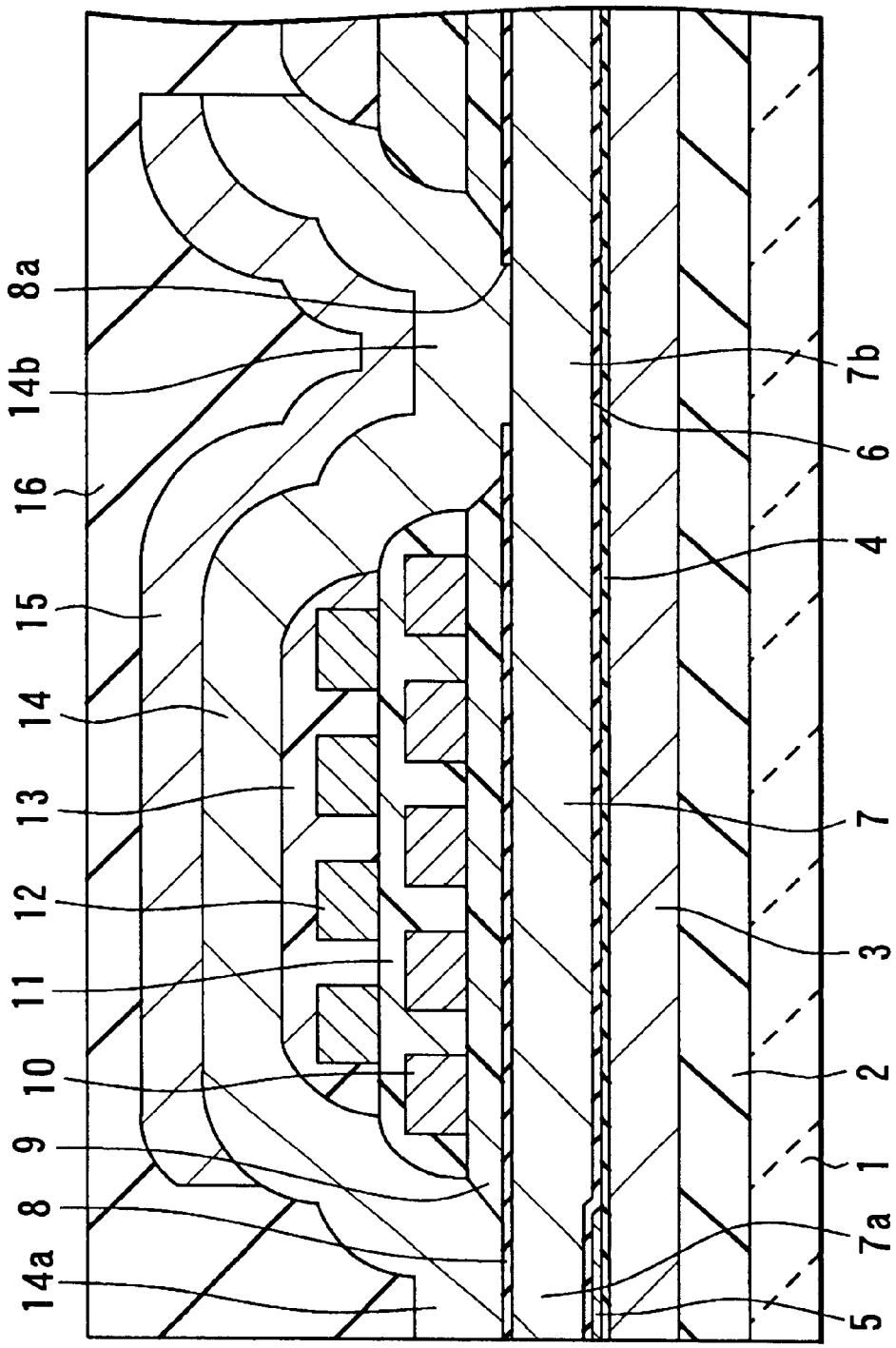
FIG. 5 is a cross section of a thin-film magnetic head of a third embodiment of the invention.

A third embodiment of the invention will now be described. FIG. 5 is a cross section of a thin-film magnetic head of the embodiment. In the magnetic head of the embodiment the medium-facing-surface-side of the nonmagnetic conductive member 15 extends to the vicinity of the pole portion 14*a*.

According to the magnetic head of the embodiment, the areas of the member 15 and the top pole layer 14 in contact with each other and facing each other are increased. As a result, the effects are enhanced. The remainder of the configuration, functions and effects of the third embodiment are similar to those of the first embodiment.

[Fourth Embodiment]

Figure 6:
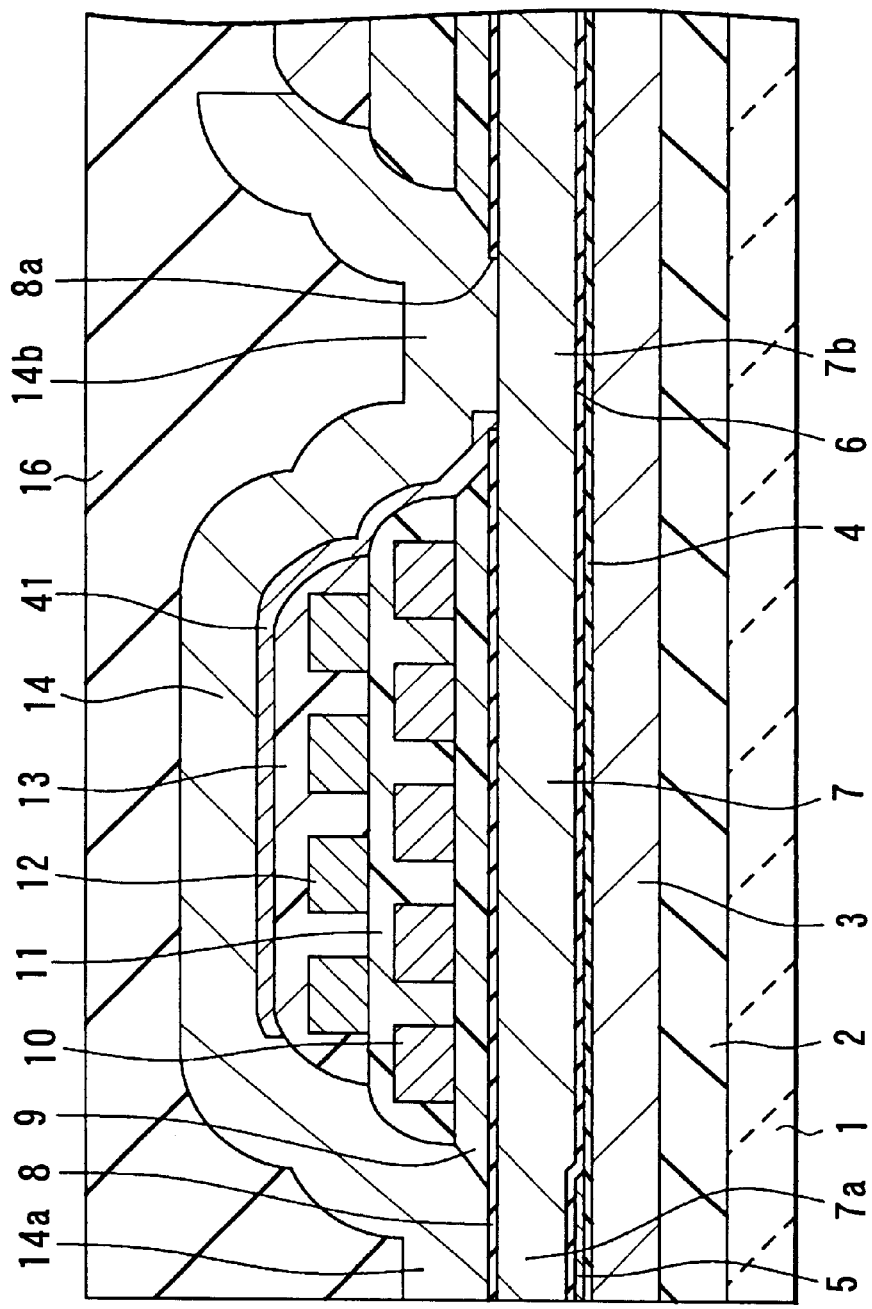
FIG. 6 is a cross section of a thin-film magnetic head of a fourth embodiment of the invention.

A fourth embodiment of the invention will now be described. FIG. 6 is a cross section of a thin-film magnetic head of the embodiment. In the magnetic head of the embodiment, the nonmagnetic conductive member 15 facing the surface of the top pole layer 14 opposite to the surface thereof on a side of which the coils 10 and 12 are placed is not provided. Instead, a nonmagnetic conductive member 41 is provided. The member 41 faces the surface of the top pole layer 14 facing the coils 10 and 12. The member 41 extends from the vicinity of the pole portion 14*a* to the vicinity of the connecting portion 14*b*.

The material and resistivity of the nonmagnetic conductive member 41 are similar to those of the member 15 of the first embodiment. The thickness of the member 41 is preferably 0.5 to 10.0 $\mu$m. The member 41 may be formed through sputtering, for example, on the recording gap layer 8 and the photoresist layers 9, 11 and 13.

If the top pole layer 14 is formed by plating, a seed layer may be made of a nonmagnetic and conductive material and the nonmagnetic conductive member 41 may be formed through the seed layer. In this case the seed layer may be made thicker in a desired region extending from the vicinity of the pole portion 14*a* to the vicinity of the connecting portion 14*b*, for example, than the other region. The thickness of part of the seed layer to be the member 41 is thereby made suitable for the member 41 as described above.

The remainder of configuration, functions and effects of the magnetic head of the embodiment are similar to those of the first embodiment.

[Comparison Among the Effects of the First to Fourth Embodiments]

Figure 7:
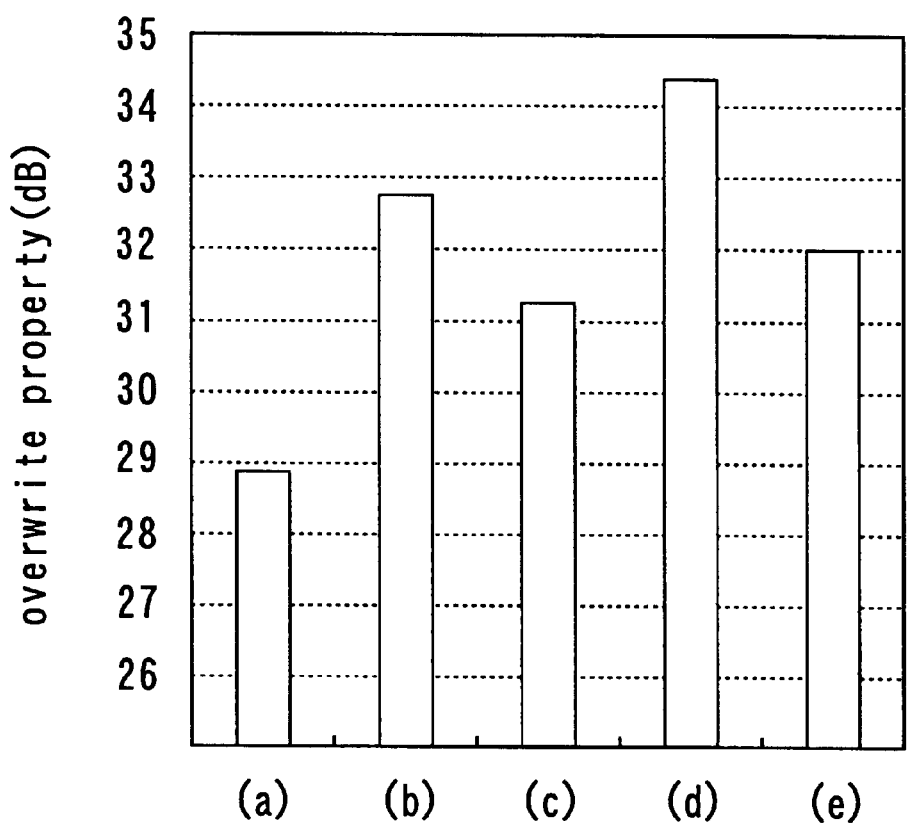
FIG. 7 is a plot for showing a result obtained through measurement of an overwrite property in the case where a nonmagnetic conductive member is not provided and in the cases of the first to fourth embodiments.
Figure 8:
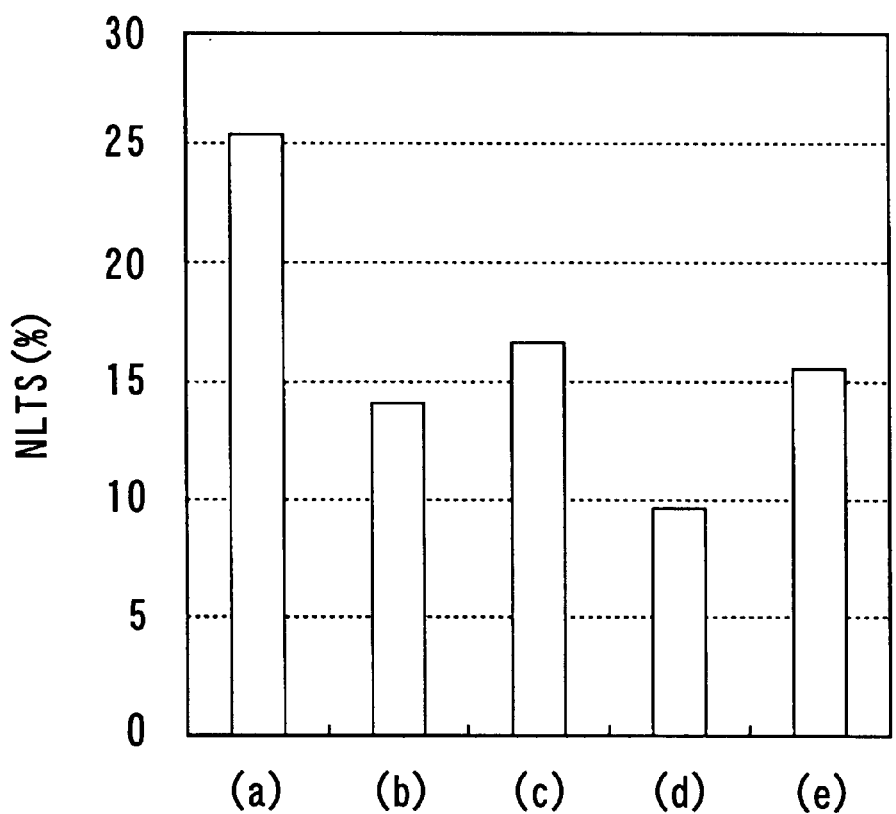
FIG. 8 is a plot for showing a result obtained through measurement of an NLTS in the case where the nonmagnetic conductive member is not provided and in the cases of the first to fourth embodiments.

Finally, the result of measurement taken to compare the effects of the first to fourth embodiments will be shown. The overwrite property and NLTS are measured several times and mean values are each obtained for the case where the nonmagnetic conductive member is not provided and for the cases of the first to fourth embodiments. FIG. 7 and FIG. 8 show the result wherein: bar (a) indicates the case where the nonmagnetic conductive member is not provided; bar (b) indicates the case of the first embodiment; bar (c) indicates the case of the second embodiment; bar (d) indicates the case of the third embodiment; and bar (e) indicates the case of the fourth embodiment. In the result shown the overwrite property is a residual component of 33 MHz indicated in decibel (dB) when data is written at a frequency of 200 MHz and in density of 300 kFCI (flux change per inch) over a region where data is written at a frequency of 33 MHz and in density of 50 kFCI. The NLTS is an NLTS measured through the fifth harmonic method using a fifth harmonic on data recorded at a maximum frequency of 200 MHz and in density of 300 kFCI, and indicated in percent. The parameters of the magnetic head used for the measurement are as follows.

magnetic path length: 40 $\mu$m throat height: 1.0 $\mu$m track width: 1.5 $\mu$m recording gap layer thickness: 0.3 $\mu$m pole portion thickness of the top pole layer: 3.0 $\mu$m pole portion thickness of the bottom pole layer: 3.0 $\mu$m saturation flux density of the top pole layer: 1.0 T saturation flux density of the bottom pole layer: 1.0 T nonmagnetic conductive member thickness (first to third embodiments): 2.0 $\mu$m nonmagnetic conductive member thickness (fourth embodiment): 2.0 $\mu$m nonmagnetic conductive member resistivity: 2.6 $\mu\Omega$-cm insulating layer thickness between the nonmagnetic conductive member and the top pole layer (second embodiment): 0.3 $\mu$m Specific figures indicating the overwrite property and NLTS shown in FIG. 7 and FIG. 8 will be given below.

If the nonmagnetic conductive member is not provided ((a) of FIG. 7 and FIG. 8), the overwrite property is 28.9 dB and the NLTS is 25.4%.

In the case of the first embodiment ((b) of FIG. 7 and FIG. 8), the overwrite property is 32.8 dB and the NLTS is 14.1%.

In the case of the second embodiment ((c) of FIG. 7 and FIG. 8), the overwrite property is 31.2 dB and the NLTS is 16.7%.

In the case of the third embodiment ((d) of FIG. 7 and FIG. 8), the overwrite property is 34.3 dB and the NLTS is 9.5%.

In the case of the fourth embodiment ((e) of FIG. 7 and FIG. 8), the overwrite property is 32.0 dB and the NLTS is 15.5%.

As thus described, the overwrite property and NLTS are improved in any of the cases of the first to fourth embodiments, compared to the case where the nonmagnetic conductive member is not provided. In particular, the effect is most remarkable in the case of the third embodiment wherein: the nonmagnetic conductive member 15 faces a portion including the vicinity of the connecting portion 14b of the top pole layer 14; the member 15 is in contact with the top pole layer 14; and the areas of the member 15 and the top pole layer 14 in contact with each other and facing each other are great. It is required that the overwrite property is 30 dB or above and the NLTS is 20% or below. If the nonmagnetic conductive member is not provided, the values required for the overwrite property and NLTS are not satisfied. In contrast, the values are both satisfied in the cases of the first to fourth embodiments.

The present invention is not limited to the foregoing embodiments but may be practiced in still other ways. For example, an insulating layer may be provided between the nonmagnetic conductive member 15 and the top pole layer 14 of the third embodiment or between the nonmagnetic conductive member 41 and the top pole layer 14 of the fourth embodiment. The nonmagnetic conductive member may be placed to face at least part of the bottom pole layer 7 or face at least portions of both top pole layer 14 and bottom pole layer 7. Alternatively, the nonmagnetic conductive member may be placed to face a lateral wall of the top pole layer 14 or the bottom pole layer 7.

In the foregoing embodiments the thin-film magnetic head is disclosed, comprising the MR element for reading formed on the base body and the induction-type magnetic transducer for writing stacked on the MR element. Alternatively, the MR element may be stacked on the magnetic transducer.

That is, the induction-type magnetic transducer for writing may be formed on the base body and the MR element for reading may be stacked on the transducer. Such a structure may be achieved by forming a magnetic film functioning as the top pole layer of the foregoing embodiments as a bottom pole layer on the base body, and forming a magnetic film functioning as the bottom pole layer of the embodiments as a top pole layer facing the bottom pole layer with a recording gap film in between. In this case it is preferred that the top pole layer of the induction-type magnetic transducer functions as the bottom shield layer of the MR element as well.

A base body having a concavity is preferred for the thin-film magnetic head having such a structure. If the coils are formed in the concavity of the base body, the thin-film magnetic head is further reduced in size.

Alternatively, the insulating layers formed between the thin-film coils forming the coils of the induction-type magnetic transducer may be all made of inorganic layers.

The invention may be applied to a thin-film magnetic head having only an induction-type magnetic transducer for performing both reading and writing.

According to the thin-film magnetic head or the method of manufacturing the same of the invention described so far, the nonmagnetic conductive member is provided to face at least part of at least one of the two magnetic layers. As a result, eddy currents are induced inside the nonmagnetic conductive member by a write current. The eddy currents suppress the magnetic field leaking from the magnetic layers. In particular, the performance characteristics of the magnetic head are improved in the case where the frequency of a write current is high.

According to the thin-film magnetic head or the method of manufacturing the same of the invention, the nonmagnetic conductive member may be provided to face a portion of at least one of the magnetic layers including the vicinity of the connecting portion. As a result, the characteristics of the magnetic head are efficiently improved According to the thin-film magnetic head or the method of manufacturing the same of the invention, the nonmagnetic conductive member may be in contact with at least one of the magnetic layers. As a result, eddy currents generated inside the magnetic layers are fed to the nonmagnetic conductive member, too. The adverse effects of eddy currents are thereby reduced and the characteristics of the magnetic head are further improved.

According to the thin-film magnetic head or the method of manufacturing the same of the invention, the resistivity of the nonmagnetic conductive member may be lower than that of the magnetic layer which the nonmagnetic conductive member faces. As a result, eddy currents are easily fed to the nonmagnetic conductive member and the characteristics of the magnetic head are more effectively improved.

Obviously many modifications and variations of the present invention are possible in the light of the above teachings. It is therefore to be understood that within the scope of the appended claims the invention may be practiced otherwise than as specifically described.

What is claimed is:

1. A thin-film magnetic head comprising:

a medium facing surface that faces toward a recording medium;

two magnetic layers, each having a first surface closer to a thin-film coil and a second surface that is farther from the thin-film coil and each being made up of at least one layer, the magnetic layers including magnetic pole portions opposed to each other and placed in regions on a side of ends of the magnetic layers closer to the medium facing surface, and connecting portions magnetically coupled to and in direct contact with each other and placed in regions on a side of the other ends of the magnetic layers, one of the magnetic layers being curved in shape;

a gap layer provided between the pole portions of the magnetic layers;

the thin-film coil placed between the magnetic layers, being insulated from the magnetic layers; and a nonmagnetic conductive member that is curved to conform to the shape of the one of the magnetic layers and placed to extend along the second surface of the one of the magnetic layers and to face part of the second surface of the one of the magnetic layers, the part of the second surface being located in the vicinity of the connecting portion.

2. The thin-film magnetic head according to claim 1, wherein the nonmagnetic conductive member is in contact with at least one of the magnetic layers.

3. The thin-film magnetic head according to claim 1, further comprising an insulating layer placed between the nonmagnetic conductive member and the magnetic layer which the nonmagnetic conductive member faces.

4. The thin-film magnetic head according to claim 1, wherein the resistivity of the nonmagnetic conductive member is lower than that of the magnetic layer which the nonmagnetic conductive member faces.

5. The thin-film magnetic head according to claim 1, wherein the end of the one of the magnetic layers closer to the medium facing surface is located at a distance from the medium facing surface.

6. A method of manufacturing a thin-film magnetic head, the head comprising:

a medium facing surface that faces toward a recording medium;

two magnetic layers, each having a first surface closer to a thin-film coil and a second surface that is farther from the thin-film coil and each being made up of at least one layer, the magnetic layers including magnetic pole portions opposed to each other and placed in regions on a side of ends of the magnetic layers closer to the medium facing surface, and connecting portions magnetically coupled to and in direct contact with each other and placed in regions on a side of the other ends of the magnetic layers, one of the magnetic layers being curved in shape;

a gap layer provided between the pole portions of the magnetic layers; and the thin-film coil placed between the magnetic layers, being insulated from the magnetic layers; the method including:

the steps of forming the magnetic layers, the gap layer, and the thin-film coil, respectively; and the step of forming a nonmagnetic conductive member such that the member is curved to conform to the shape of the one of the magnetic layers, extends along the second surface of the one of the magnetic layers and faces part of the second surface of the one of the magnetic layers, the part of the second surface being located in the vicinity of the connecting portion.

7. The method according to claim 6, wherein the nonmagnetic conductive member is brought to contact with at least one of the magnetic layers in the step of forming the nonmagnetic conductive member.

8. The method according to claim 6, further including the step of forming an insulating layer between the nonmagnetic conductive member and the magnetic layer which the nonmagnetic conductive member faces.

9. The method according to claim 6, wherein the resistivity of the nonmagnetic conductive member is lower than that of the magnetic layer which the nonmagnetic conductive member faces.

10. The method according to claim 6, wherein the end of the one of the magnetic layers closer to the medium facing surface is located at a distance from the medium facing surface.

* * * * *